S. J. DUNKLEY.
LYEING SECTION OF PEELING MACHINES.
APPLICATION FILED JAN. 28, 1919.
1,427,269.
Patented Aug. 29, 1922.
5 SHEETS—SHEET 1.
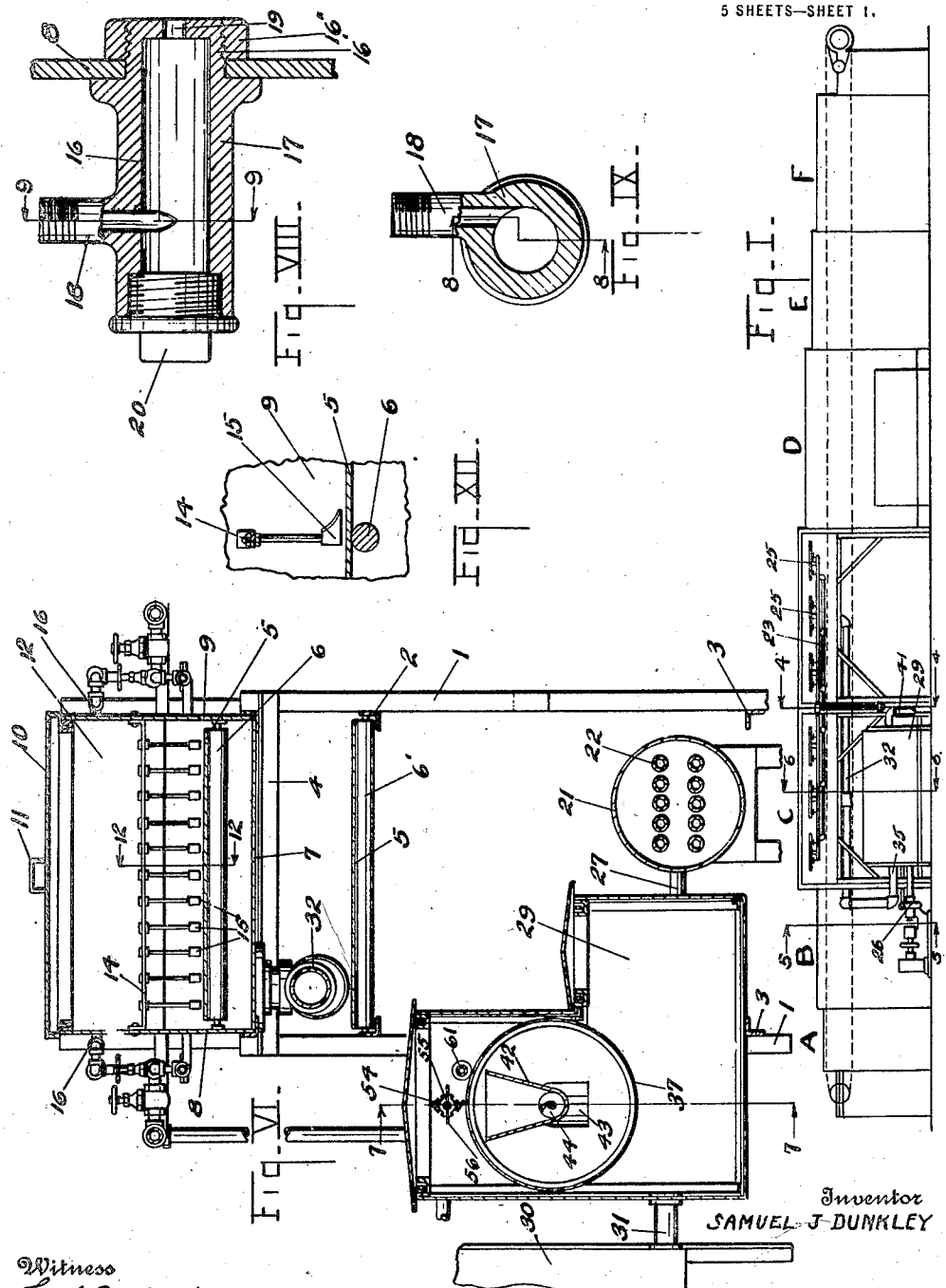
Witness
Fred Ullrich
M. Louise Thurston
Inventor
SAMUEL J. DUNKLEY
By C. Chappell Karl
Attorney S. J. DUNKLEY.
LYEING SECTION OF PEELING MACHINES.
APPLICATION FILED JAN. 28, 1919.
1,427,269.
Patented Aug. 29, 1922.
5 SHEETS—SHEET 2.
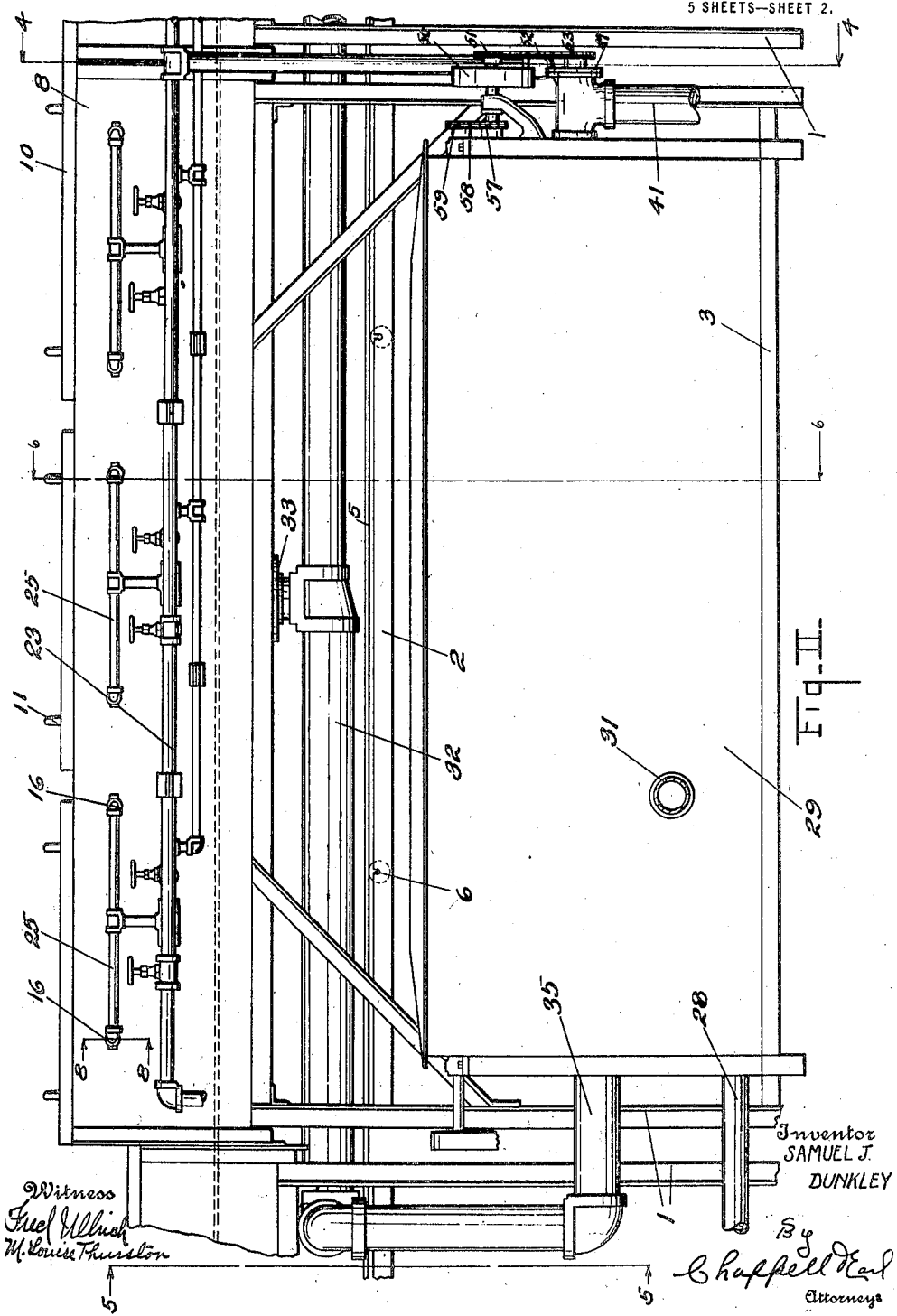
Fig. II.
Witness
Fred Ullrich
M. Louise Thurston
Inventor
SAMUEL J. DUNKLEY
By
Chappell Earl
Attorneys

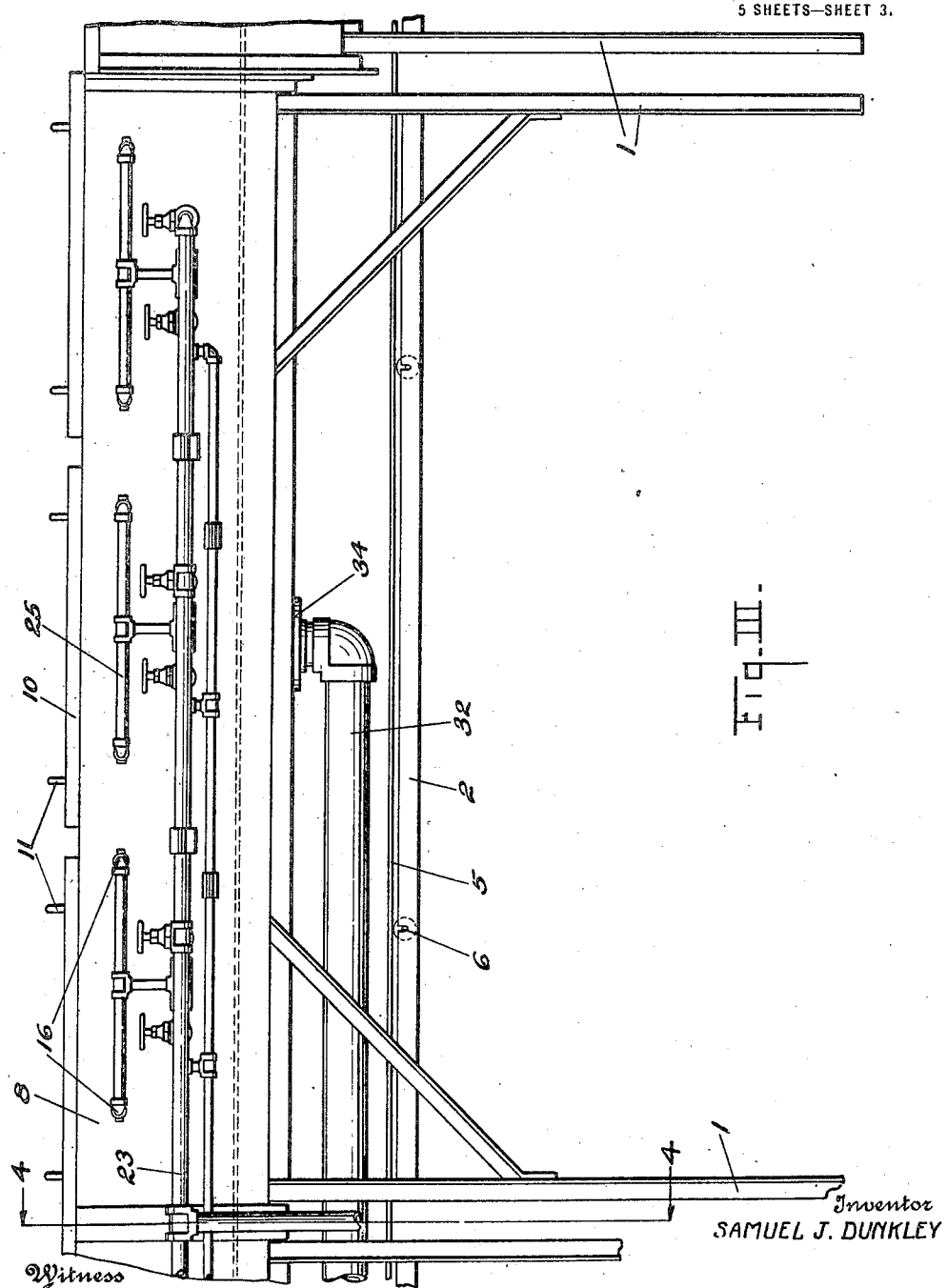

S. J. DUNKLEY.
LYEING SECTION OF PEELING MACHINES.
APPLICATION FILED JAN. 28, 1919.
1,427,269.
Patented Aug. 29, 1922.
5 SHEETS—SHEET 4.
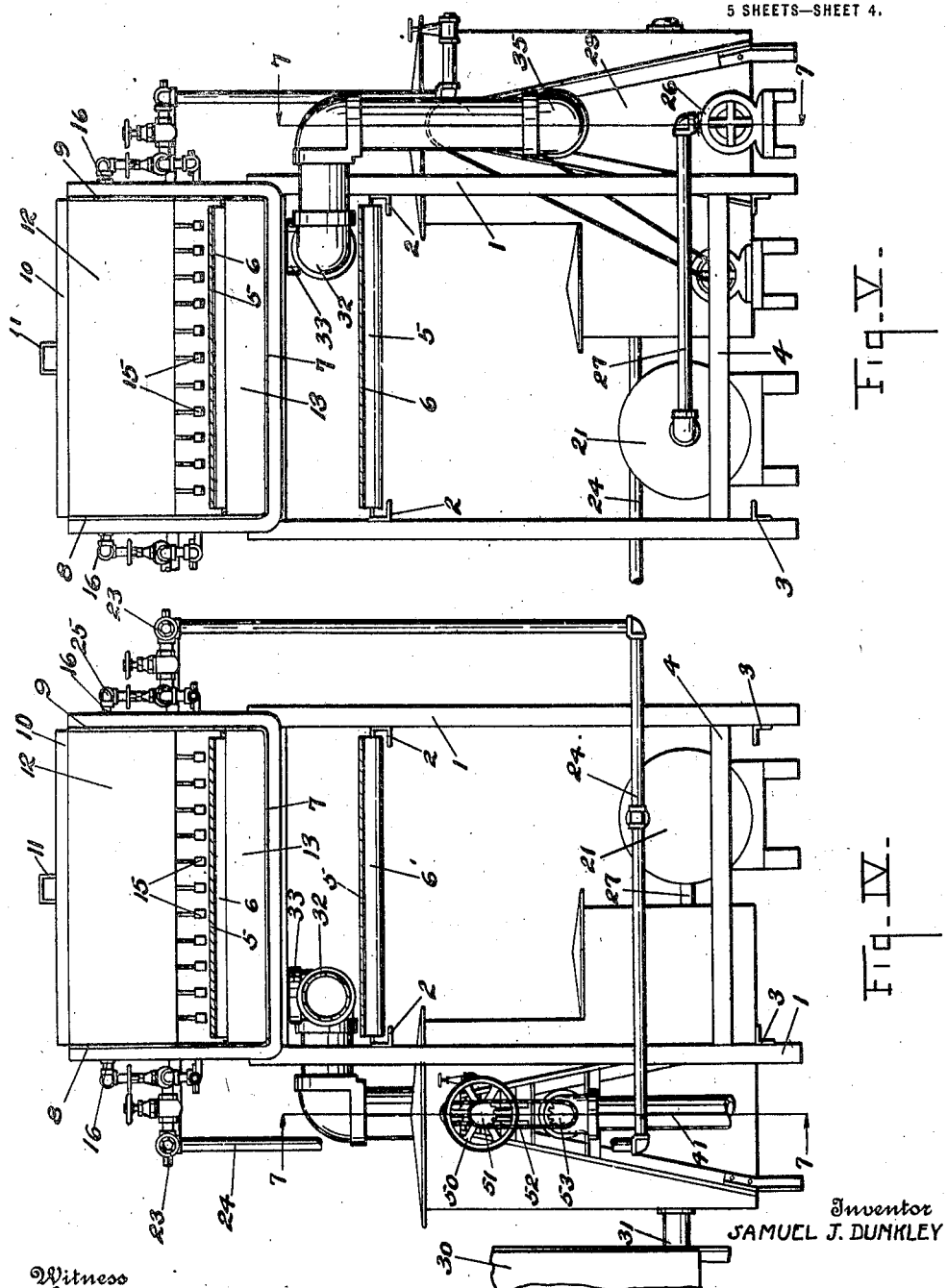
Inventor
SAMUEL J. DUNKLEY

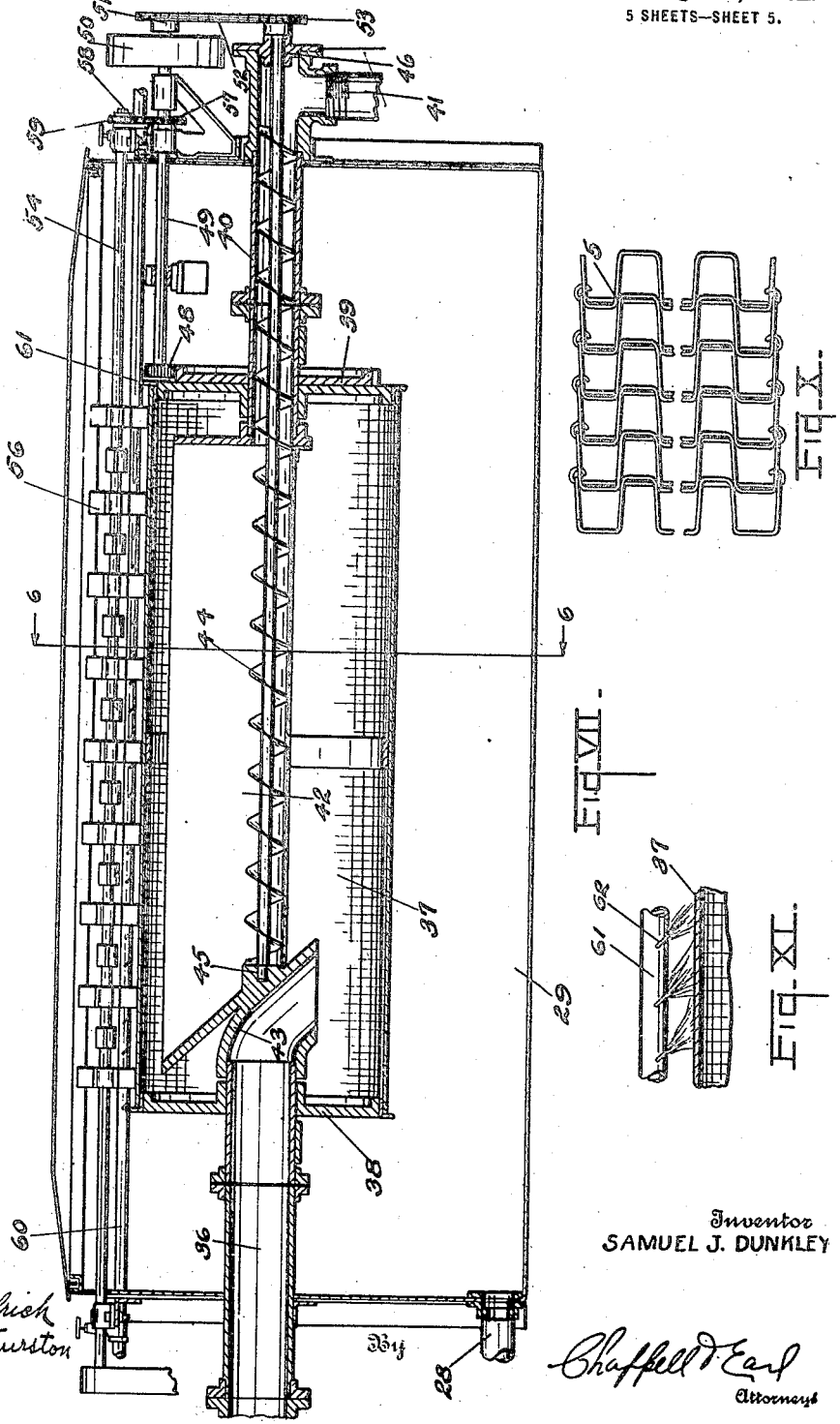

UNITED STATES PATENT OFFICE.

SAMUEL J. DUNKLEY, OF KALAMAZOO, MICHIGAN, ASSIGNOR TO DUNKLEY COMPANY, OF KALAMAZOO, MICHIGAN, A CORPORATION OF MICHIGAN.

LYEING SECTION OF PEELING MACHINES.

1,427,269.  Specification of Letters Patent.  Patented Aug. 29, 1922.

Application filed January 28, 1919. Serial No. 273,596.

*To all whom it may concern:*

Be it known that I, SAMUEL J. DUNKLEY, a citizen of the United States, residing at the city and county of Kalamazoo, State of Michigan, have invented certain new and useful Improvements in Lyeing Sections of Peeling Machines, of which the following is a specification.

This invention relates to improvements in the lyeing section of a peach peeling machine such as that described in my concurrent application Serial Number 273,595, and to the process of developing a lye spray or mist for use in the treatment of peaches and similar fruit and certain kinds of vegetables, such as sweet potatoes.

The objects of the invention are:

First, to provide in such a device means for conserving and economizing in the use of the lye of the solution.

Second, to provide an effective structure for maintaining the strength of the solution and keeping the same free from debris.

Third, to provide an improved spray means.

Fourth, to provide an improved circulating system.

Objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention and a preferred apparatus for carrying out the process is fully illustrated in the accompanying drawing, forming a part of this specification, in which:

Fig. I is a diagrammatic elevation view of one of my improved peach peeling outfits, the lye section being outlined and the remaining portions of the machine being indicated by diagram.

Fig. II is an enlarged detail side elevation view of the left hand portion of the lye structure, as it appears in Fig. I.

Fig. III is a similar enlarged detail side elevation view of the right hand portion so that the two Figures II and III when placed end to end constitute an enlarged side elevation view of the lye section of my improved peach peeling apparatus to which my inventions and improvements described herein relate.

Fig. IV is a detail sectional view taken on the line 4—4 of Figs. I, II and III, a part only of the mixing tank being shown at the left of the figure and the supply pipe to the left hand header being broken away to show details.

Fig. V is a detail sectional view on line 5—5 of Fig. II, showing the lye screen, heater and the motors for operating the pump and rotary screen.

Fig. VI is a detail transverse sectional view taken on line 6—6 of Figs. I, II and VII, showing details of construction of the lye heater and the screen and other parts.

Fig. VII is an enlarged detail longitudinal sectional elevation view on line 7—7 of Figs. IV, V and VI, showing details of the rotary screen.

Fig. VIII is an enlarged detail longitudinal sectional view on the irregular section line 8—8 of Figs. II and IX, showing details of one of the lye spray nozzles.

Fig. IX is a detail sectional view of the spray nozzles, taken on line 9—9 of Fig. VIII.

Fig. X is a detail of a portion of the openwork conveyor belt for carrying the peaches through the lye section.

Fig. XI is a detail view of a part of the steam jet structure for clearing the rotary screen.

Fig. XII is a detail sectional view on line 12—12 of Fig. VI, showing the little plows for agitating the load of peaches or other fruit on the conveyor belt as it passes.

In the drawing similar reference characters refer to similar parts throughout the several views, and the sectional views are taken looking in the direction of the little arrows at the ends of the section lines.

Considering the reference characters, the different parts of the peach peeler are given general reference letters in Fig. I. A is the feed section, B the preheating section, C the lye section here under consideration, D the water section, E the blanching section, and F the inspection section.

The machine comprises a general framework supported by legs 1 connected by longitudinal frame bars 2 and 3 connected by suitable cross bars 4 at intervals. An endless openwork conveyor belt 5 is carried on and actuated by suitable drums at each end of the machine and is supported by suitable rollers 6, 6' disposed at intervals through the frame. The upper run of this conveyor is embraced by an open-end longitudinal trough-like casing, having a bottom 7 and sides 8 and 9. Cover sections 10 with suitable handles 11 for lifting the same are provided over this general longitudinal casing.

The lye compartment is separated into sections by partial partitions 12 extending down from the top, the lower edge of each of which is at sufficient height to permit the conveyor belt 5 and its load of fruit or vegetables to pass, and by partial partitions 13 extending up from the bottom to form collecting pans to collect the surplus lye and the lye after it has been used to return it through the drain into the system to be used over and over again.

At intervals in the lye section are cross bars 14 from which are suspended little plow-shaped agitators 15 pointing forwardly to engage and agitate the load of fruit or vegetables on the belt. A series of these are disposed in staggered relation to insure the thorough turning of all material on the belt. However, when a thin layer is passed along, the plows may be dispensed with.

Connected to the sides 8 and 9 at intervals are spray nozzles 16. These are constructed much on the principle of fruit spray nozzles. The lye solution is delivered into the cylindrical body 17 tangentially through the nipple 18, the spray being discharged at the nozzle 19 in a whirling spray or fog. This nozzle is drilled out and made very regular and smooth, the out end being stopped by the plug 20 which can be very readily removed for clearing out the nozzle whenever that should become necessary. The nozzle is flanged at 16' and is threaded to receive the nut 16" which secures it in the hole in the side wall 8 or 9. However, in this kind of nozzle the openings are so large that there is very little likelihood of clogging and at the same time the spray, owing to the centrifugal action, is given a swirling motion which breaks up the liquid into very small particles. As these sprays are disposed on both side walls 8 and 9, the finely divided spray is projected completely across the lye chamber, which is then filled with a very fine floating mist in addition to a considerable quantity of coarser particles. The relative amounts of heavy spray and mist depend upon the degree of pressure.

The solution is delivered from the heater 21 which is heated by steam coils 22 to a temperature of substantially 230° Fahr. The solution is delivered to the main headers 23 through the pipe 24 and from thence to the auxiliary headers 25, to which the nipple 18 of the spray nozzles is connected. Because of the high temperature a large part of the water on its escape from the nozzle changes to steam, thus leaving the spray particles very strong of the lye and the steam helps maintain the desired high temperature.

An electrically driven centrifugal pump 26 delivers the solution through the pipe 27 to the said heater 21, the pump being supplied by a pipe 28 from the storage tank 29. The storage tank is replenished from the mixing tank 30 through the pipe 31 (see Figs. IV and VI).

The lye section is drained through the pipe 32 which is provided with flange connections 33 and 34 on the under side of the section, and delivers downwardly at 35 and axially through pipe 36 into a rotary screen 37, thence into the storage tank 29.

A rotary screen 37 is provided with heads 38 and 39, which are suitably supported within the storage tank 29. The head 38 is journaled on the pipe 36 and the head 39 is journaled on the pipe 40, through which debris such as disintegrated peel is delivered from the system to the drainage pipe 41.

Within the rotary screen is supported a V-shaped trough 42 which is supported by elbow 43 that is connected to the end of the return pipe 36 at its left hand end, and at its right hand end it is supported on the inner end of the pipe 40. In the bottom of this V-shaped trough and extending out through the pipe 40 is a screw conveyor 44, the same being suitably journaled at 45 at its inner end and at 46 at its outer end in a flange 47 for the pipe 40.

The rotary screen is driven by a pinion 48 engaging the gear 39', which is secured to the head 39 of the screen. The pinion 48 is carried by shaft 49 supported in suitable bearings and driven at its outer end by pulley 50. A sprocket wheel 51 is on the outer end of the shaft 49 and carries a sprocket chain 52 which drives the screw conveyor 44 by means of the driven sprocket wheel 53. The rotary screen can be readily removed by withdrawing the conveyor 44 and detaching the pipe couplings of the pipes 36 and 40.

Disposed above the rotary screen is a revolving shaft 54, bearing at intervals cross arms 55, which carry flexible tappers 56 disposed and arranged to strike against the upper side of the screen 37 as the shaft 54 is revolved. The rotation of the shaft is accomplished from a sprocket gear 57 on the shaft 49, driving a chain 58 to the sprocket 59 on the end of said shaft 54.

Disposed at one side of the shaft 54 are steam pipes 60 and 61, substantially parallel with the shaft and extending to substantially the center from each end wall. These steam pipes are slitted on their underside at 62 in proper position to deliver jets of steam against the upper part of the rotary screen, as indicated in Fig. XI. Two pipes are made use of, extending in from opposite ends half way each, rather than a single pipe, extending the entire length, so that the screen may be thoroughly cleaned by strong jets one half at a time to avoid any unnecessary lowering of the steam pressure. Of course the pipe might extend clear across, so far as its work here is concerned, if there was an ample steam supply.

I have described my improved lye section in detail in the form preferred by me. I desire to state, however, that if the lye solution is raised to a high temperature under high pressure and is discharged into a suitable chamber, the evaporation of the water, changing it to steam, will secure the effects which I have secured here, but in a lesser degree.

I have shown a compact heater with a centrifugal pump for maintaining the pressure, but these results, so far as my improved process is concerned, might be attained in various ways. Of course the results I have attained, so far as the high temperature and pressure are concerned, could be attained by supplying a constant supply of fresh solution, but this would be wasteful where the solution is so concentrated as I use it, and I have therefore provided screen means for removing the debris because this means is so effective that more or less of the peel of the fruit will slough off at this stage, and it is necessary that it be collected and effectively screened out in order to secure best results at the nozzle. By this means and providing a replenishing means for the storage, which of course may be any suitable mixing means, I have provided a practically continuous lye system for the peeling of fruit or vegetables of the very highest efficiency and economy.

I desire to claim the invention in the specific form which I have illustrated and also desire to claim the same broadly, both as to the apparatus and process, as pointed out in the appended claims.

Having thus described my invention, what I claim as new and desire to secure by Letters Patent is:

1. In a lye apparatus for peeling machine, the combination of a suitable casing; a conveyor belt to carry the fruit or vegetable to be peeled therethrough; partitions extending down from the top of said casing and dividing it into compartments, the lower edge of which clears the upper surface of the said conveyor and its load; agitator plows supported to act upon the load on the belt as it is passing; a spray nozzle secured to the opposite side walls of said casing and delivering inwardly; means of delivering heated solution under pressure thereto, comprising an enclosed tank with heater means, and a centrifugal pump delivering into and through the said heater to maintain the pressure therein, a supply tank for the said pump, a screen means within the said tank, and a drainage from the said casing to the screen means; and means for delivering a fresh mixture of solution to the said tank, all coacting substantially as described for the purpose specified.

2. In a lye apparatus for peeling machine, the combination of a suitable casing; a conveyor belt to carry the fruit or vegetable to be peeled therethrough; partitions extending down from the top of said casing and dividing it into compartments, the lower edge of which clears the upper surface of the said conveyor and its load; agitator plows supported to act upon the load on the belt as it is passing; a spray nozzle secured to the wall of said casing and delivering inwardly; means of delivering heated solution under pressure thereto, comprising an enclosed tank with heater means, and a centrifugal pump delivering into and through the said heater to maintain the pressure therein, a supply tank for the said pump, a screen means within the said tank, and a drainage from the said casing to the screen means; all coacting substantially as described for the purpose specified.

3. In a lye apparatus for peeling machine, the combination of a suitable casing; a conveyor belt to carry the fruit or vegetable to be peeled therethrough; partitions extending down from the top of said casing and dividing it into compartments, the lower edge of which clears the upper surface of the said conveyor and its load; a spray nozzle secured to the wall of said casing and delivering inwardly; means of delivering heated solution under pressure thereto, comprising an enclosed tank with heater means, and a centrifugal pump delivering into and through the said heater to maintain the pressure therein, a supply tank for the said pump, a screen means within the said tank, and a drainage from the said casing to the screen means; all coacting substantially as described for the purpose specified.

4. In a lye apparatus for peeling machine, the combination of a suitable casing, a support for fruit within said casing, a spray nozzle secured to the wall of said casing and delivering inwardly above said fruit, means of delivering heated solution under pressure thereto whereby the same will be delivered in a spray above the fruit, all coacting substantially as described for the purpose specified.

5. In a lye apparatus for peeling machine, the combination of a suitable casing, means of delivering heated solution under pressure thereto, comprising an enclosed tank with heater means, and a centrifugal pump delivering into and through the said heater to maintain the pressure therein, a supply tank for the said pump, a screen means within the said tank, and a drainage from the said casing to the screen means; all coacting substantially as described for the purpose specified.

6. The process of spraying fruit with disintegrating solution consisting in heating the solution above the boiling point of water under pressure, delivering the solution through spray nozzles to release the pressure and permit a conversion of part of the water into steam and delivering the concentrated solution in a fine spray or mist, and confining the same in a suitable chamber around the fruit that is being treated.

7. The process of spraying fruit with disintegrating solution consisting in heating the solution above the boiling point of water under pressure, delivering the solution to release the pressure and permit a conversion of part of the water into steam and delivering the concentrated solution in a fine spray or mist, and confining the same in a suitable chamber around the fruit that is being treated.

8. The process of spraying fruit with disintegrating solution consisting in heating the solution above the boiling point of water under pressure, delivering the solution to release the pressure and permit a conversion of part of the water into steam and delivering the concentrated solution, and confining the same in a suitable chamber around the fruit that is being treated.

9. In a lye or disintegrating means, the combination with a suitable casing, a nozzle spray extending into and secured to said casing comprising a cylindrical bore with axial jet outlet directed into the casing, and a nipple connected to deliver the solution tangentially to the cylindrical bore, coacting as specified.

10. In a lye apparatus for peeling machine, the combination of a suitable casing, a support for fruit within said casing, a nozzle delivering inwardly above said fruit, means of delivering heated solution under pressure thereto, all coacting substantially as described for the purpose specified.

In witness whereof, I have hereunto set my hand and seal in the presence of two witnesses.

SAMUEL J. DUNKLEY. [L. S.]

Witnesses:
LUELLA G. GREENFIELD,
MARTHA J. GREGORY.